(12) United States Patent
Cain, Jr. et al.

(10) Patent No.: US 8,316,006 B2
(45) Date of Patent: Nov. 20, 2012

(54) CREATING AN ONTOLOGY USING AN ONLINE ENCYCLOPEDIA AND TAG CLOUD

(75) Inventors: Clyde Lee Cain, Jr., Raleigh, NC (US); Feng-Wei Chen, Cary, NC (US); Yoo Y. Lee, Durham, NC (US); Margaret J. Mago, Durham, NC (US); Nikhil Parekh, Raleigh, NC (US); William D. Reed, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 12/827,060

(22) Filed: Jun. 30, 2010

(65) Prior Publication Data
US 2012/0005195 A1    Jan. 5, 2012

(51) Int. Cl.
*G06F 17/30*    (2006.01)
(52) U.S. Cl. ........ 707/707; 707/710; 707/740; 707/796; 707/800
(58) Field of Classification Search .................. None
See application file for complete search history.

(56) References Cited

U.S. PATENT DOCUMENTS

| | | | |
|---|---|---|---|
| 7,512,576 B1 | 3/2009 | Syeda-Mahmood et al. | |
| 8,037,066 B2 * | 10/2011 | Majko | 707/734 |
| 2008/0071929 A1 * | 3/2008 | Motte et al. | 709/246 |
| 2008/0133488 A1 * | 6/2008 | Bandaru et al. | 707/3 |
| 2009/0094190 A1 * | 4/2009 | Stephens | 707/2 |
| 2010/0030552 A1 | 2/2010 | Chen et al. | |
| 2010/0036856 A1 * | 2/2010 | Portilla | 707/100 |
| 2010/0082628 A1 | 4/2010 | Scholz | |
| 2010/0161620 A1 * | 6/2010 | Lamere et al. | 707/749 |
| 2010/0174743 A1 * | 7/2010 | Komano et al. | 707/769 |

OTHER PUBLICATIONS

Schrammel et al. "Semantically structured tag clouds: an empirical evaluation of clustered presentation approaches", ACM Apr. 9, 2009, pp. 2037-2040.*
Pei, Minghua, et al., "Constructing a Global Ontology by Concept Mapping Using Wikipedia Thesaurus", 22nd International Conference on Advanced Information Networking and Applications-Workshops, 2008.
Motta, Eduardo,et al, "Populating a domain ontology from web historical dictionaries and encyclopedias", Proceedings of the 2008 Euro American Conference on Telematics and Information Systems.
Alani, Harith, et al., "Web based Knowledge Extraction and Consolidation for Automatic Ontology Instantiation", Workshop on Knowledge Markup and Semantic Annotation, Knowledge Capture (K-Cap'03), University of Southhampton.

* cited by examiner

*Primary Examiner* — Debbie Le
(74) *Attorney, Agent, or Firm* — Charles L. Moore; Moore & Van Allen PLLC (57) ABSTRACT

A method for generating an ontology may include selecting, by a processing device, a tag in a tag cloud. The method may also include searching, by the processing device, an online encyclopedia for content corresponding to the selected tag and determining, by the processing device, at least one category to which the content belongs in the online encyclopedia in response to finding the content corresponding to the selected tag in the online encyclopedia. The method may additionally include adding, by the processing device, a class to the ontology corresponding to the at least one category of the content in the online encyclopedia.

17 Claims, 5 Drawing Sheets

CREATING AN ONTOLOGY USING AN ONLINE ENCYCLOPEDIA AND TAG CLOUD

BACKGROUND

Aspects of the present invention relate to creating an ontology that can be used to build a semantic web, and more particularly to a method, system and computer program product for creating an ontology using one or more online encyclopedias and one or more tag clouds.

The World Wide Web or Internet has provided humans with the capability to perform many tasks, such as locating information on a variety of different subjects. Web pages are designed for humans, making such tasks easily completed by a human but difficult if not nearly impossible for a machine or computer system. An evolving development of the World Wide Web in which the meaning or semantics of information is defined in a form that is more understandable by computers is the Semantic Web. The Semantic Web may enable computers to perform the tedious tasks of finding and combining information from the Web. One step in creating the Semantic Web may be to create an ontology that can be used to classify web pages. The process of creating an ontology typically involves assembling a panel of "subject matter experts" to determine the contents and structure of the ontology. Because of the vastness of the information on the web, creating an ontology in this manner may prove to be impractical.

BRIEF SUMMARY

According to one aspect of the present invention, a method for generating an ontology may include selecting, by a processing device, a tag in a tag cloud. The method may also include searching, by the processing device, an online encyclopedia for content corresponding to the selected tag and determining, by the processing device, at least one category to which the content belongs in the online encyclopedia in response to finding the content corresponding to the selected tag in the online encyclopedia. The method may additionally include adding, by the processing device, a class to the ontology corresponding to the at least one category of the content in the online encyclopedia.

According to another aspect of the present invention, a system for generating an ontology may include an ontology miner to mine a tag cloud. The ontology miner examines each tag in the tag cloud for the number of web pages that are associated with each tag. Once the number of web pages that has been associated with each tag reaches a preset threshold of importance, the system may search an online encyclopedia for an article or content with the same name as the tag. Any article may be mined for the category that the article belongs to as part of the online encyclopedia. The category may be interrogated for any parent categories. This process may be repeated for all parental categories until a root category is reached. A category hierarchy may be defined by the parental categories from the category of the article to the root category. The category hierarchy may be used to create or form an ontology class structure. An inferencing engine may be used to determine implicit relationships between the ontology classes based at least in part on relationships between categories in the category hierarchy.

According to another aspect of the present invention, a system for generating an ontology may include a processing device. The system may also include an ontology miner operating on the processing device to mine a tag cloud. The ontology miner may be adapted to search an online encyclopedia for content corresponding respectively to each selected tag of a plurality of tags in the tag cloud. The ontology miner may also be adapted to determine at least one category to which the content belongs in the online encyclopedia for each selected tag in response to finding content corresponding to the selected tag in the online encyclopedia. An ontology class structure may be formed from the at least one category of the content corresponding to each of the selected tags.

According to a further aspect of the present invention, a computer program product for generating a ontology may include a computer readable storage medium having computer readable program code embodied therewith. The computer readable program code may include computer readable program code configured to select a tag in a tag cloud for generating the ontology. The computer readable program code may also include computer readable program code configured to search an online encyclopedia for content corresponding to the selected tag. The computer readable program code may additionally include computer readable program code configured to determine at least one category to which the content belongs in the online encyclopedia in response to finding the content corresponding to the selected tag in the online encyclopedia. The computer readable program code may further include computer readable program code configured to add a class to the ontology corresponding to the at least one category of the content in the online encyclopedia.

BRIEF DESCRIPTION OF THE SEVERAL VIEWS OF THE DRAWINGS

The present, invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
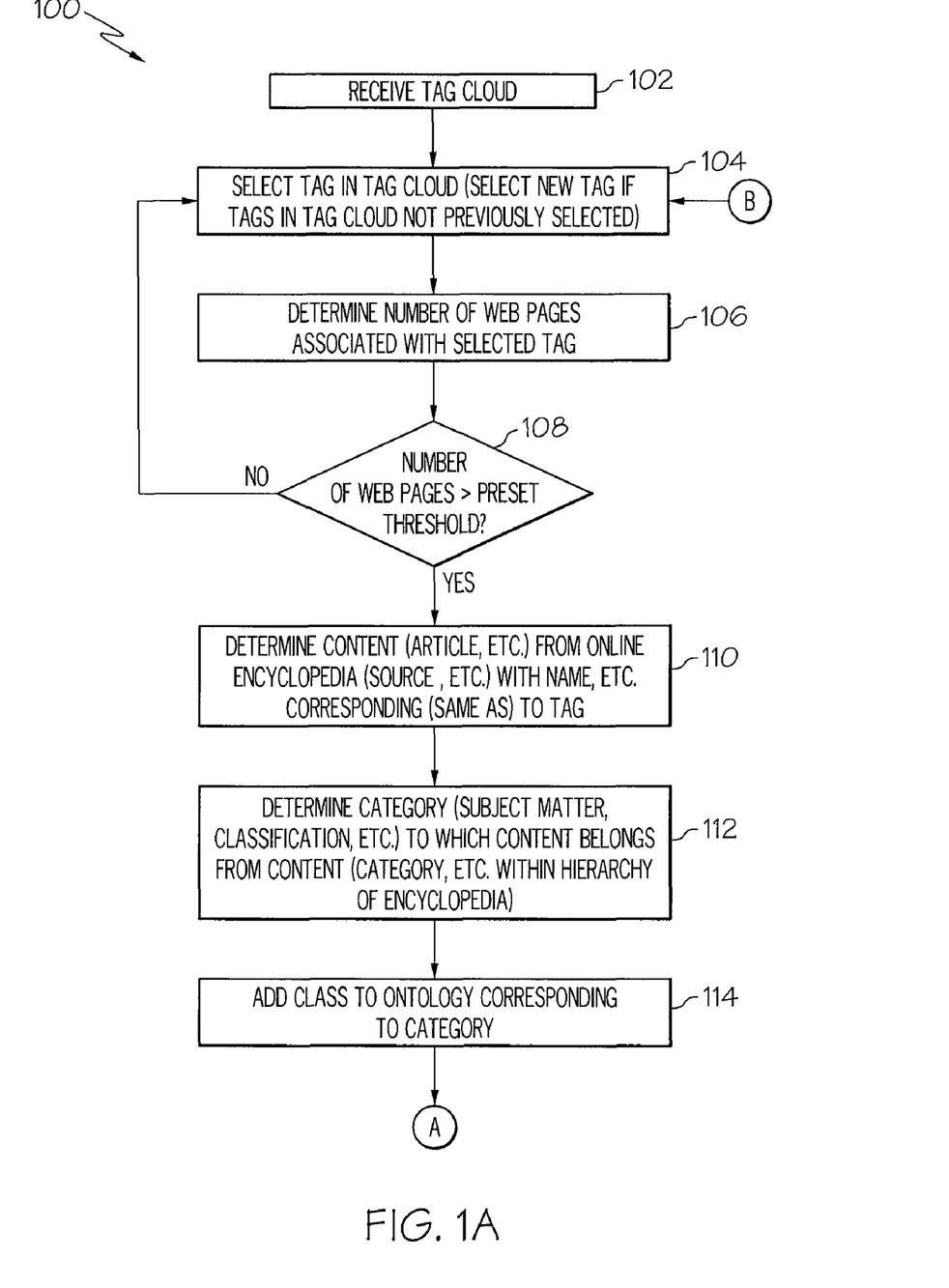
FIGS. 1A and 1B are a flowchart of an example of a method for generating an ontology in accordance with an embodiment of the present invention.
Figure 1B:
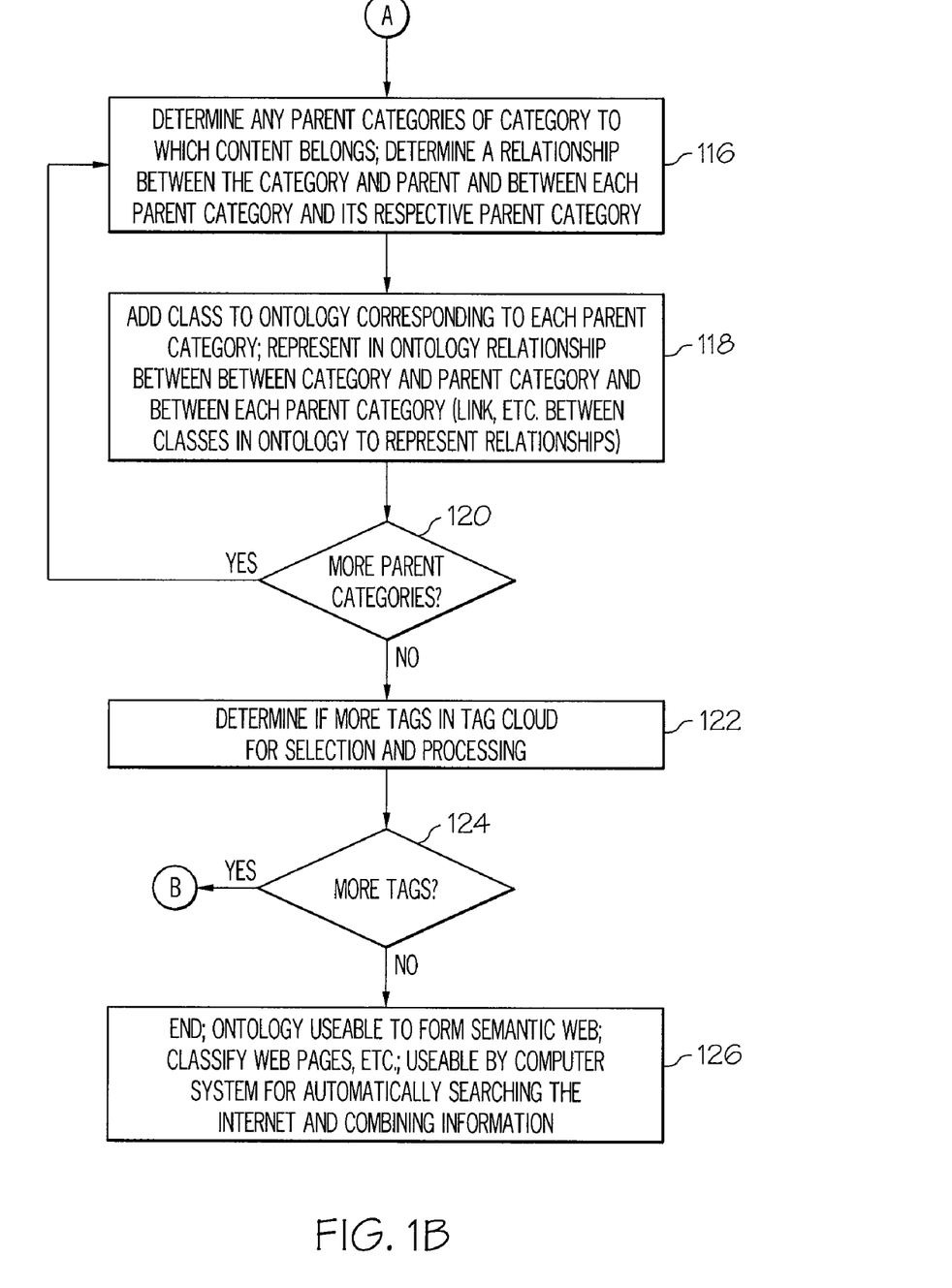
Figure 2:
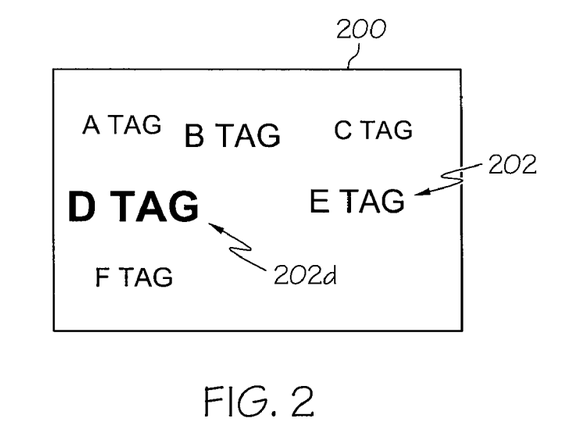
FIG. 2 is a representation of an example of a tag cloud in accordance with an embodiment of the present invention.

FIGS. 1A and 1B are a flowchart of an example of a method 100 for generating an ontology in accordance with an embodiment of the present invention. In block 102, a tag cloud may be received. The tag cloud may be received by a processing device, server or similar device for generating the ontology as described herein. An example of a tag cloud 200 is illustrated in FIG. 2. A tag cloud is a visual depiction of user-generated tags 202, or simply the word content of a website. Tag clouds may be used to describe the content of a website. The tags 202 are usually single words and are normally listed alphabetically as illustrated in FIG. 2. An importance of the tag 202 or popularity may be illustrated by a font size of the tag and/or color of the tag. For example, the "D tag" 202$d$ in tag cloud 200 would have had the highest importance or popularity compared to the other tags 202 in the tag cloud 200. The tag D tag 202$d$ may have more web sites associated with it or linked by it than the other tags 202 in the tag cloud 200.

Returning to FIG. 1A, in block 104, a tag may be selected in the tag cloud. If a tag has been previously selected in the tag cloud for processing by the method 100, a new tag may be selected in the tag cloud that has not previously been selected for processing by the method 100 and for generating or forming the ontology.

In block 106, a number of the web page associated with the selected tag may be determined. As previously discussed, the tag may include hyperlinks to multiple web pages. The font size of the tag may provide an indication of the importance or popularity of the tag based on the number of web pages linked by the tag.

In block 108, a determination may be made whether the number of web pages associated with the selected tag exceeds a preset threshold number. If the number of web pages does not exceed the preset threshold, the method 100 may return to block 104 and a new tag may be selected from the tag cloud for processing. If the number of web pages associated with the tag exceeds the preset threshold in block 108, the method 100 may advance to block 110.

In block 110, content from an online encyclopedia may be determined or found in which a name or other identification of the content corresponds to or is substantially the same as the name or identification of the selected tag currently being processed by the method 100. The content may be an article in the online encyclopedia or any other data or information corresponding to the selected tag. As used herein, encyclopedia may include any source of information containing content corresponding to the name or identification of the selected tag.

In block 112, a category in the online encyclopedia to which the content belongs may be determined. The category of the content may be determined from the content itself. For example, the category of the content may be determined from a title of an article, context of the content, keywords associated with the content or other information associate with the content. The category of the content may also be determined from a classification of the content in the encyclopedia as well as by other means. As used herein, a category may be any subject matter indexing, classification scheme, topic listing or other arrangement that may be utilized in an online encyclopedia or the like to arrange content in the encyclopedia and to facilitate location of information related to specific categories, subcategories, and so forth. The categories, subcategories and further subcategories within the encyclopedia may define a hierarchy into which the content may be categorized and indexed or located. The categories may range from a root category or most basic category to a highest level category. For example, geography may be a root category and a city may be the highest level category. Continent and country may be intermediate subcategories.

Figure 3:
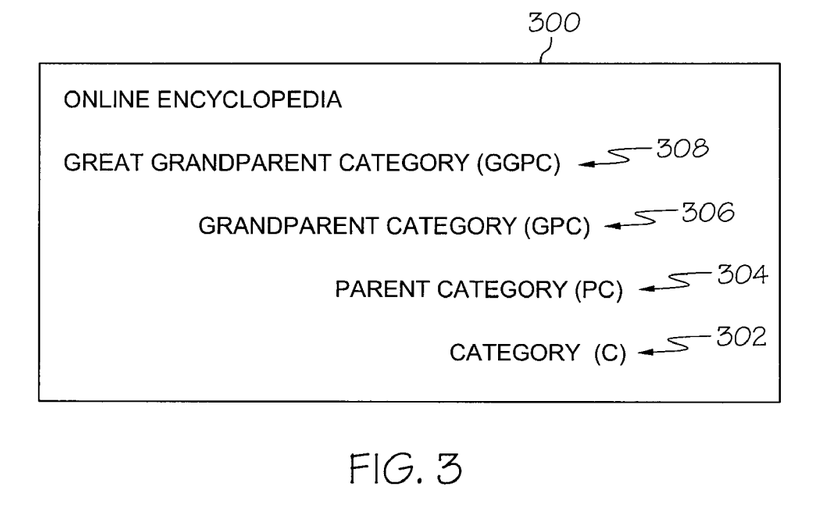
FIG. 3 is a representation of an example of a hierarchy of categories in an online encyclopedia structure in accordance with an embodiment of the present invention.

An example a hierarchy of an online encyclopedia structure 300 is illustrated in FIG. 3. The encyclopedia structure 300 may include multiple categories and subcategories. For example, a category 302 may have a parent category 304. The parent category 304 maybe may have a grand parent category 306 and the grand parent category may have a great grand parent category 308.

Returning to FIG. 1A, in block 114, a class may be added to an ontology or ontology class structure corresponding to each category to which the content belongs. The ontology class may correspond to the particular category or subcategory in the online encyclopedia as described in more detail with reference to FIG. 4 which illustrates an example of an ontology class structure 400.

In block 116, any parent categories of the category to which the content belongs may be determined. A relationship between the category and any parent categories and the relationship between each parent category and its respective parent or higher level category in the category hierarchy may be determined.

In block 118, a class may be added to the ontology or ontology class structure corresponding to each parent category. A relationship between each category and parent category and between each of the parent categories and their respective parent may also be represented in the ontology. The relationships may be represented by a link or by other means between the classes or levels of classes in the ontology.

In block 120, a determination may be made whether or there are more parent categories associated with the content in the online encyclopedia. If there are more parent categories the method 100 may return to block 116 and the method 100 may continue similar to that previously described. If there are no more parent categories in the online encyclopedia, the method 100 may advance to block 122.

In block 122, a determination may be made if there are more tags in the tag cloud that have not be selected and processed by the method 100. In block 124, if there are more tags in the tag cloud to be processed, the method 100 may return to block 104 in FIG. 1A and the method 100 may proceed similar to that previously described. If a determination is made in block 124 that there are no more tags in the tag cloud and all of the tags have been processed, the method 100 may advance to block 126.

In block 126, the method 100 may end. The ontology or ontology structure that has been generated or formed may be used to form a Semantic Web or part of the Semantic Web. The ontology may be used to classify web pages or for other purposes to assist in automatically searching for information by a computer system.

Figure 4:
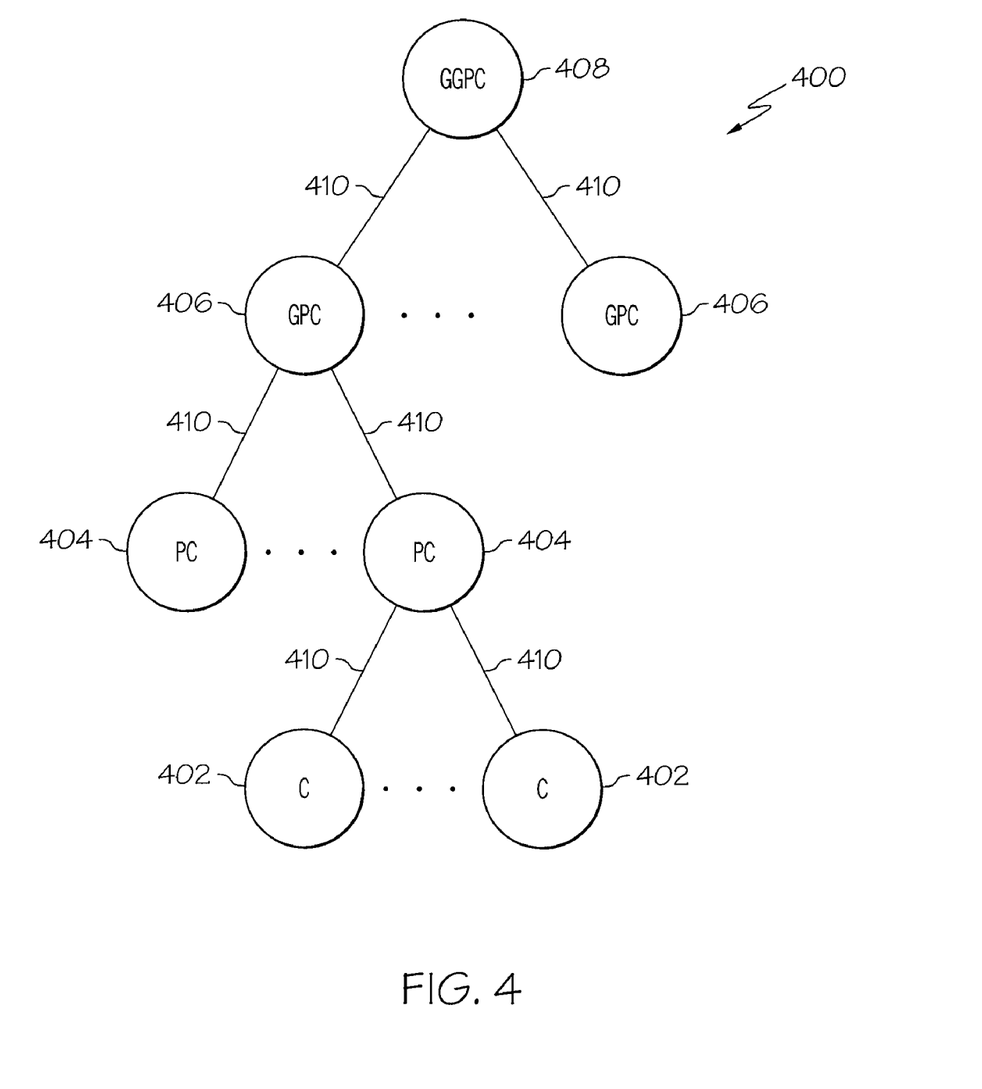
FIG. 4 is a representation of an example of an ontology class structure in accordance with an embodiment of the present invention.

FIG. 4 is a representation of an example of an ontology class structure 400 in accordance with an embodiment of the present invention. The different classes and levels of classes may be represented by circles 402-408. Each of the circles may be labeled by an identification or name of the class. Each class may correspond to a category in the online encyclopedia. For example, referring also to be exemplary online encyclopedia structure 300 in FIG. 3, the class 402 in the ontology class structure 400 may correspond to the category (C) 302 in the online encyclopedia structure 300. The next level class 404 in the ontology structure 400 may correspond to the parent category (PC) 304 of the online encyclopedia structure 300. The next level class 406 may correspond to the grandparent category (GPC) 306 and the highest level class 408 may correspond to the great grandparent category (GGPC) 308 in the online encyclopedia structure 300 and so forth depending upon the hierarchy of categories in the online encyclopedia structure for the particular content of interest. The relationship between the different categories in the online encyclopedia may be represented in the ontology class structure 400 by a link 410 between those classes that have a relationship or are related in some manner.

Figure 5:
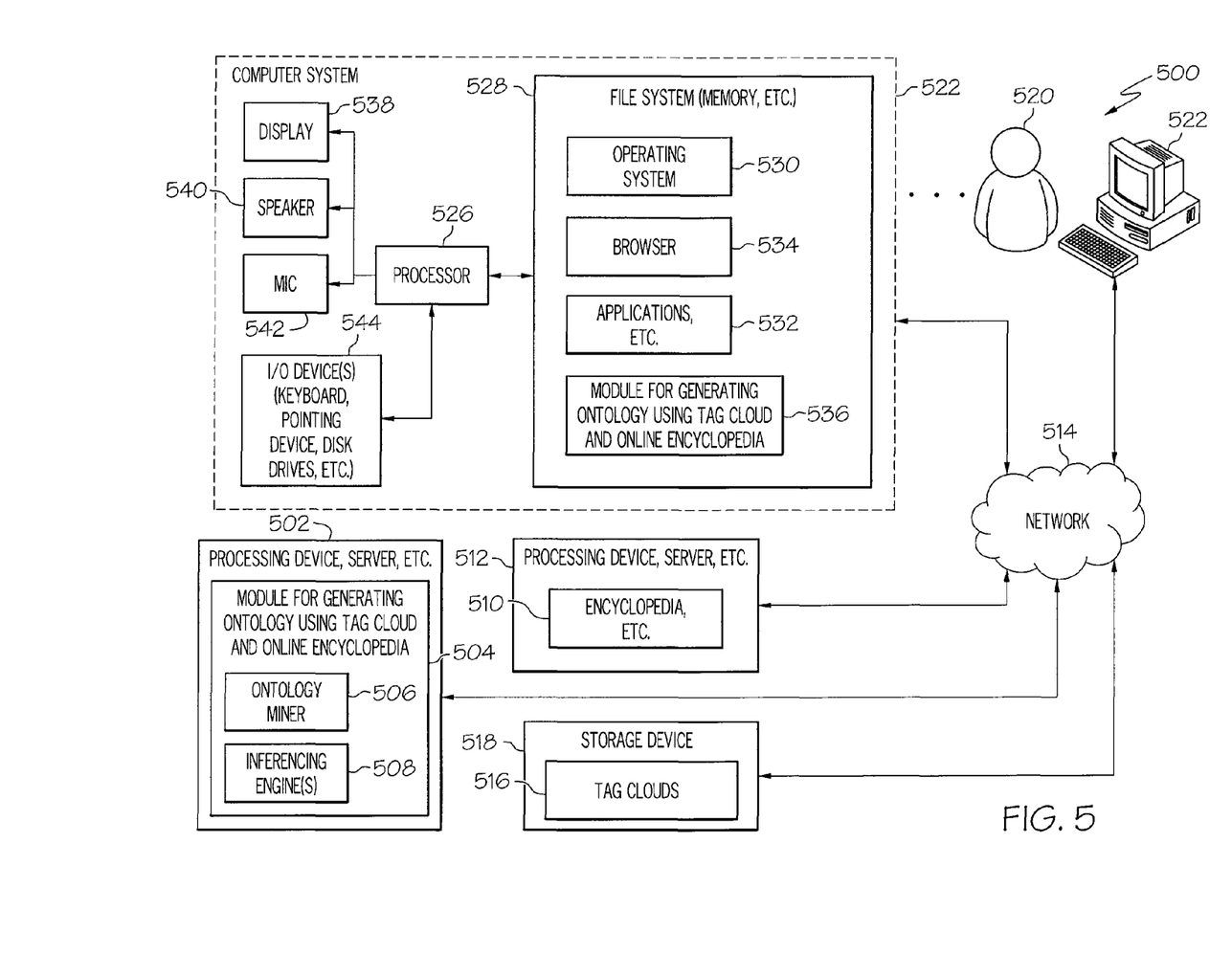
FIG. 5 is a block schematic diagram of an example of a system for generating an ontology in accordance with an embodiment of the present invention.

FIG. 5 is a block schematic diagram of an example of a system 500 for generating or forming an ontology or ontology class structure in accordance with an embodiment of the present invention. The method 100 of FIGS. 1A and 1B may be embodied in and performed by the system 500. The system 500 may include a server 502 or processing device. A module 504 for generating an ontology using tag clouds and online encyclopedias, similar to that previously described, may be operable on the server 502 or processing device. The module 504 may be stored on a file system of the server 502.

The module for generating the ontology 504 may include an ontology miner 506. Portions or all of the operations of method 100 in FIGS. 1A and 1B may be embodied in the ontology miner 506. The ontology miner 506 may be adapted to search an online encyclopedia for content corresponding respectively to each selected tag of a plurality of tags in a tag cloud. The ontology miner 506 may also be adapted to determine at least one category to which the content belongs in the online encyclopedia for each selected tag in response to finding content corresponding to the selected tag in the online encyclopedia. The ontology miner may also be adapted to determine any parent categories in the online encyclopedia for the at least one category to which the content belongs and may add a class to an ontology or ontology class structure corresponding to each category associated with the content in the online encyclopedia.

The module for generating the ontology 504 may also include an inferencing engine or engines 508. The inferencing engine or engines may be used to determine a relationship between each parent category and the at least one category to which the content belongs in the online encyclopedia and to represent these relationships on the ontology or ontology class structure in some manner, such as for example that illustrated and described with reference to FIG. 4.

The system 500 may also include an online encyclopedia 510 or similar source of information. The encyclopedia 510 may reside on a processing device or server 512 or maybe stored on a storage device on a network 514.

The system 500 may also include one or more tag clouds 516. The tag clouds 516 may be stored on one or more storage devices 518 that may be accessed via the network 514.

A user 520 may use a computer system 522 to access the servers 502 and 512 and storage device 518 via the network 514. The computer system 322 may be any type of communications device including a mobile communications device or the like capable of performing the functions or operations described herein. The network 514 may be the Internet, an intranet or other private or proprietary network.

The computer system 522 may include a processor 526 to control operation of the computer system 522. The computer system 522 may also include a file system 528, memory or similar data storage device in communication with the processor 526. An operating system 530, applications 532 and other programs may be stored on the file system 528 for running or operating on the processor 526. A web or Internet browser 534 may also be stored on the file system 528 for accessing the server 502 via the network 514.

A module for generating an ontology 536 may also be stored on the file system 528 for operation on the processor 526. The module for generating an ontology 536 may operate in association with the module for generating an ontology 504 on the server 502 to perform the features and functions described herein. In another embodiment the module 536 may be provided for generating the ontology rather than the module 504.

The computer system 522 may also include a display 538 for presenting the ontologies and other information generated by the method and systems described herein. The computer system 522 may also include a speaker system 540 for receiving and presenting audio content. The computer system 522 may additionally include a microphone 542 for the user 520 to provide voice commands and to communicate via the computer system 522.

The computer system 522 may further include one or more input devices, output devices or combination input/output devices, collectively I/O devices 544. The I/O devices 544 may include a keyboard, pointing device, such as a mouse or other computer pointing device, disk drives and any other devices to permit a user, such as user 520, to interface with and control operation of the computer system 522 and to go online and access the server 502 and other online resources.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for generating an ontology, comprising:
selecting, by a processing device, a tag in a tag cloud;
searching, by the processing device, an online encyclopedia for content corresponding to the selected tag;
determining a number of web pages associated with the selected tag, wherein searching the online encyclopedia for content corresponding to the selected tag comprises searching the online encyclopedia in response to the number of web pages associated with the selected tag exceeding a preset threshold;
determining, by the processing device, at least one category to which the content belongs in the online encyclopedia in response to finding the content corresponding to the selected tag in the online encyclopedia; and
adding, by the processing device, a class to the ontology corresponding to the at least one category of the content in the online encyclopedia.

2. The method of claim 1, further comprising determining any parent categories in the online encyclopedia for the at least one category to which the content belongs.

3. The method of claim 2, further comprising adding another class to the ontology corresponding to each parent category in response to determining each parent category in the online encyclopedia to which the content belongs.

4. The method of claim 3, further comprising determining a relationship between each parent category and the at least one category.

5. The method of claim 4, further comprising representing in the ontology the relationship between the at least one category and its parent category and the relationship between each parent category and its respective parent category.

6. The method of claim 5, wherein representing the relationship between the categories in the ontology comprises generating a class structure by connecting by a link between the class in the ontology corresponding to the at least one category and the class in the ontology corresponding to its parent category, and connecting by another link between each class in the ontology corresponding to each parent category and the class in the ontology corresponding to each parent category's respective parent category.

7. The method of claim 1, further comprising:
determining if there are additional tags in the tag cloud that have not been selected for generating the ontology; and
selecting a next tag in the tag cloud for generating the ontology in response to determining there are additional tags in the tag cloud.

8. The method of claim 1, further comprising using the ontology to form a semantic web that is searchable by a computer system.

9. The method of claim 1, further comprising using the ontology to classify a web page.

10. A system for generating an ontology, comprising:
a processing device including a processor; and
an ontology miner operating on the processing device to mine a tag cloud, the ontology miner being adapted to search an online encyclopedia for content corresponding respectively to each selected tag of a plurality of tags in the tag cloud, the ontology miner also being adapted to determine at least one category to which the content belongs in the online encyclopedia for each selected tag in response to finding content corresponding to the selected tag in the online encyclopedia, and wherein an ontology class structure is formed from the at least one category of the content corresponding to each of the selected tags; and
a module to determine a number of web pages associated with each selected tag, wherein searching the online encyclopedia for content corresponding to each selected tag comprises searching the online encyclopedia in response to the number of web pages associated with each selected tag exceeding a preset threshold.

11. The system of claim 10, further comprising:
a module to determine any parent categories in the online encyclopedia for the at least one category to which the content belongs; and
a module to add another class to the ontology corresponding to each parent category in response to determining each parent category in the online encyclopedia to which the content belongs to form the ontology class structure.

12. The system of claim 11, further comprising an inferencing engine to determine a relationship between each parent category and the at least one category.

13. The system of claim 12, further comprising a module to represent the relationship between the categories in the ontology class structure by connecting a link between the class in the ontology corresponding to the at least one category and the class in the ontology corresponding to its parent category, and connecting another link between each class in the ontology corresponding to each parent category and the class in the ontology corresponding to each parent category's respective parent category.

14. A computer program product for generating an ontology, the computer program product comprising:

a computer readable storage medium having computer readable program code embodied therewith, the computer readable program code comprising: computer readable program code configured to select a tag in a tag cloud; computer readable program code configured to search an online encyclopedia for content corresponding to the selected tag;
computer readable program code configured to determining a number of web pages associated with the selected tag, wherein the online encyclopedia is searched for content corresponding to the selected tag in response to the number of web pages associated with the selected tag exceeding a preset threshold;
computer readable program code configured to determine at least one category to which the content belongs in the online encyclopedia in response to finding the content corresponding to the selected tag in the online encyclopedia; and
computer readable program code configured to add a class to the ontology corresponding to the at least one category of the content in the online encyclopedia.

15. The computer program product of claim 14, wherein the computer readable program code further comprises:
computer readable program code configured to determine any parent categories in the online encyclopedia for the at least one category to which the content belongs; and
computer readable program code configured to add another class to the ontology corresponding to each parent category in response to determining each parent category in the online encyclopedia to which the content belongs.

16. The computer program product of claim 15, wherein the computer readable program code further comprises:
computer readable program code configured to determining a relationship between each parent category and the at least one category; and
computer readable program code configured to represent in the ontology the relationship between the at least one category and its parent category and the relationship between each parent category and its respective parent category.

17. The computer program product of claim 15, wherein the computer readable program code further comprises:
computer readable program code configured to determining a relationship between each parent category and the at least one category; and
computer readable program code configured to represent the relationship between the categories in the ontology by connecting a link between the class in the ontology corresponding to the at least one category and the class in the ontology corresponding to its parent category, and connecting another link between each class in the ontology corresponding to each parent category and the class in the ontology corresponding to each parent category's respective parent category.

* * * * *